US006933696B2

(12) United States Patent
Ueda et al.

(10) Patent No.: US 6,933,696 B2
(45) Date of Patent: Aug. 23, 2005

(54) DRIVING DEVICE AND IMAGE FORMING DEVICE

(75) Inventors: Tadayuki Ueda, Kokubunji (JP); Hiroyuki Maruyama, Kanagawa (JP); Jun Onishi, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 10/831,271

(22) Filed: Apr. 23, 2004

(65) Prior Publication Data

US 2005/0046365 A1 Mar. 3, 2005

(30) Foreign Application Priority Data

Aug. 29, 2003 (JP) ....................................... 2003-306461

(51) Int. Cl.[7] .................................................. B25J 9/10

(52) U.S. Cl. ............. 318/568.17; 318/560; 318/568.18; 399/130; 399/167

(58) Field of Search ............................ 318/560, 568.17, 318/568.18, 445, 450, 456, 461; 399/130, 167, 177

(56) References Cited

U.S. PATENT DOCUMENTS 4,723,145 A * 2/1988 Takada et al. ................ 399/36
4,876,679 A * 10/1989 Mukai ..................... 369/44.29
5,473,445 A * 12/1995 Takei et al. ................. 358/474
6,158,839 A * 12/2000 Fukushima et al. ........... 347/33
6,205,918 B1 * 3/2001 Takahashi et al. .......... 101/118
6,311,613 B1 * 11/2001 Takahashi ................... 101/118
6,625,411 B2 * 9/2003 Yoda et al. ................. 399/167
6,760,559 B2 * 7/2004 Koide ........................ 399/165

* cited by examiner

*Primary Examiner*—Rina Duda
(74) *Attorney, Agent, or Firm*—Lucas & Mercanti, LLP

(57) ABSTRACT

There is described an image-forming apparatus having a rotation system constituted by a driving roller, a driven roller and a transfer belt, threaded on both the driving roller and the driven roller. The apparatus includes: a motor to drive the rotation system, a rotational axis of the motor being coupled to the driving roller directly or through a power transmission element disposed between them; a first rotational-velocity controlling section to control a first rotational velocity of the motor; a velocity detecting section to detect a second rotational velocity of the driving roller or the driven roller; and a second rotational-velocity controlling section to also control the first rotational velocity of the motor, based on a detected signal detected by the velocity detecting section. The second rotational-velocity controlling section employs either a feedback controlling method or a feed-forward controlling method to control the first rotational velocity.

16 Claims, 7 Drawing Sheets

DRIVING DEVICE AND IMAGE FORMING DEVICE

BACKGROUND OF THE INVENTION

The present invention relates to a driving device using a general-purpose motor with a velocity controlling circuit attached.

In an image forming device having a plurality of photoconductors (hereinafter, also referred to as photoreceptors) whereon electrostatic latent images are formed and a transfer body whereon electrostatic latent images are transferred, the photoconductors and transfer body are preferably driven at a fixed velocity. When a difference (different velocities) is generated in velocity between the photoconductors and the transfer body, images cannot be transferred from the plurality of photoconductors at a fixed position, thus the color mismatching occurs in the full color image.

As a factor for different velocities, it may be considered that a driving roller for driving the photoconductors and transfer body is driven by a motor via a gear driving transmission mechanism such as a plurality of gears, so that variation factors such as the backlash and eccentricity of the plurality of gears are not transmitted to the control system of the motor.

Therefore, Patent Document 1 discloses an image forming device, as a driving roller for driving the photoconductors and transfer body without using drive transmission gears causing different velocities, having a structure of including the motor body inside the roller and a motor of an outer roller (roller-in motor) for driving the housing.

[Patent Document 1]

Tokkaihei 6-271131

According to the invention described in Patent Document 1, however, it is necessary to form a motor and a driving device only for driving the photoconductors and transfer body, thus an increase in cost is caused.

Further, as factors for different velocities, in addition to the backlash and eccentricity of the plurality of gears, the electrical effect when the photoconductors and transfer body are charged and the effects of the contact resistance when the photoconductors make contact with the transfer body, expansion and contraction variations of an elastic body such as a belt as a member used in the transfer body and photoconductors, the distortion and eccentricity of a metallic member used for a drum, and the rushing resistance of paper when it is conveyed to the transfer body as a recording material may be cited.

Therefore, in addition to velocity control by the motor itself, velocity variations caused by variation factors such as the gears driven by the motor, photoconductors, and transfer body must be reduced.

SUMMARY OF THE INVENTION

To overcome the abovementioned drawbacks in conventional image-forming apparatus, it is an object of the present invention to provide an image forming apparatus at a low price, in which velocity variations of a power transmission element driven by a general-purpose motor, to which a velocity control circuit is attached, are reduced, and which makes it possible to reduce the color mismatching.

Accordingly, to overcome the cited shortcomings, the abovementioned object of the present invention can be attained by rotation system driving device and image-forming apparatus described as follow.

(1) A device for driving a rotation system, comprising: a first rotational-velocity controlling section to control a first rotational velocity of a motor, which is coupled to a driven axis of the rotation system through a power transmission element; a velocity detecting section to detect a second rotational velocity at the power transmission element; and a second rotational-velocity controlling section to also control the first rotational velocity of the motor, based on a detected signal detected by the velocity detecting section.

(2) The device of item 1, wherein one of the first rotational-velocity controlling section and the second rotational-velocity controlling section coarsely controls the first rotational velocity, while another one of them finely controls the first rotational velocity.

(3) The device of item 1, wherein the second rotational-velocity controlling section employs either a feedback controlling method or a feed-forward controlling method to control the first rotational velocity.

(4) The device of item 1, wherein the power transmission element is a gear or a gears train including a plurality of gears.

(5) An apparatus for forming an image, comprising: a rotation system that is constituted by at least a transfer belt, a driving roller and a driven roller, wherein the transfer belt is threaded on both the driving roller and the driven roller; a motor that serves as a driving device to drive the rotation system, a rotational axis of the motor being coupled to the driving roller directly or through a power transmission element disposed between them; a first rotational-velocity controlling section to control a first rotational velocity of the motor; a velocity detecting section to detect a second rotational velocity of the driving roller or the driven roller; and a second rotational-velocity controlling section to also control the first rotational velocity of the motor, based on a detected signal detected by the velocity detecting section.

(6) The apparatus of item 5, wherein one of the first rotational-velocity controlling section and the second rotational-velocity controlling section coarsely controls the first rotational velocity, while another one of them finely controls the first rotational velocity.

(7) The apparatus of item 5, wherein the second rotational-velocity controlling section employs either a feedback controlling method or a feed-forward controlling method to control the first rotational velocity.

(8) The apparatus of item 5, wherein the power transmission element is a gear or a gears train including a plurality of gears.

(9) The apparatus of item 5, wherein the transfer belt includes a photosensitive material or is a photoreceptor belt.

(10) The apparatus of item 5, wherein the image is a color image.

(11) An apparatus for forming an image, comprising: a transfer drum; a motor that serves as a driving device to drive the transfer drum, a rotational axis of the motor being coupled to the transfer drum through a power transmission element disposed between them; a first rotational-velocity controlling section to control a rotational velocity of the motor; a velocity detecting section to detect a circumferential-surface velocity of the transfer drum; and a second rotational-velocity controlling section to also control the rotational velocity of the motor, based on a detected signal detected by the velocity detecting section.

(12) The apparatus of item 11, wherein one of the first rotational-velocity controlling section and the second rotational-velocity controlling section coarsely controls the rotational velocity of the motor, while another one of them finely controls the rotational velocity of the motor.

(13) The apparatus of item 11, wherein the second rotational-velocity controlling section employs either a feedback controlling method or a feed-forward controlling method to control the rotational velocity of the motor.

(14) The apparatus of item 11, wherein the power transmission element is a gear or a gears train including a plurality of gears.

(15) The apparatus of item 11, wherein the transfer drum includes a photosensitive material or is a photoreceptor drum.

(16) The apparatus of item 11, wherein the image is a color image.

Further, to overcome the abovementioned problems, another driving device and other image-forming apparatus, embodied in the present invention, will be described as follow:

(17) A driving device, characterized in that, in the driving device of a rotation system in which a power transmission element is coupled to a rotation axis of a motor to which a first rotational-velocity controlling means is attached in advance, there are provided:

velocity detecting means for detecting a rotational velocity at the power transmission element; and a second rotational-velocity controlling means for controlling the rotational velocity of the motor, based on a detected signal detected by the velocity detecting means.

(18) An image-forming apparatus, characterized in that, in the image-forming apparatus, in which a photoreceptor belt is threaded between a driving roller and a driven roller, that is provided with a driving device in which a power transmission element is coupled to a rotation axis of a motor, to which a first rotational-velocity controlling means is attached in advance, directly or through a gear, there are provided:

velocity detecting means for detecting a rotational velocity of the driving roller or the driven roller; and second rotational-velocity controlling means for conducting a feedback control or a feed-forward control for controlling the rotational velocity of the motor, based on a detected signal detected by the velocity detecting means.

(19) An image-forming apparatus, characterized in that, in the image-forming apparatus that is provided with a driving device of a rotation system, in which a transfer drum or a photoreceptor drum is coupled to a rotation axis of a motor, to which a first rotational-velocity controlling means is attached in advance, through a gear transmission mechanism, there are provided:

velocity detecting means for detecting a circumferential surface velocity of the driving roller or the driven roller; and second rotational-velocity controlling means for conducting a feedback control or a feed-forward control for controlling the rotational velocity of the motor, based on a detected signal detected by the velocity detecting means.

(20) The image-forming apparatus described in item 18 or 19, characterized in that, the image-forming apparatus forms a color image.

According to the driving device described in item 1 or 17, a driving device for a motor with a first rotational velocity controlling means attached includes a second rotational velocity controlling means for detecting the rotational velocity of the power transmission element and controlling the rotational velocity of the motor on the basis of the detected velocity, thus double control by the first rotational velocity controlling means and the second rotational velocity controlling means can be constituted easily at a low price, and a variation factor generated in the power transmission element can be controlled by the second rotational velocity controlling means, and the velocity controllability for the whole system can be improved.

According to the image-forming apparatus described in item 5 or 18, a driving device for a motor with a first rotational velocity controlling means attached includes a second rotational velocity controlling means for detecting the rotational velocity of the driving roller or follower roller and controlling the rotational velocity of the motor on the basis of the detected velocity, thus double control by the first rotational velocity controlling means and the second rotational velocity controlling means can be constituted easily at a low price, and different velocities due to improvement of the velocity controllability for the transfer belt or photosensitive belt can be reduced. Further, the second rotational velocity controlling means executes feedback control or feed-forward control, so that the driving device can respond to sudden velocity variations or the presupposed velocity variations and without increasing the gear accuracy unnecessarily, the driving device can execute stable velocity control.

According to the image-forming apparatus described in item 11 or 19, a driving device for a motor with a first rotational velocity controlling means attached includes a second rotational velocity controlling means for detecting the circumferential-surface velocity of the transfer drum or photosensitive drum and controlling the rotational velocity of the motor on the basis of the detected velocity, thus double control by the first rotational velocity controlling means and the second rotational velocity controlling means can be constituted easily at a low price, and different velocities due to improvement of the rotational velocity controllability for the transfer drum or photosensitive drum can be reduced. Further, the second rotational velocity controlling means executes feedback control or feed-forward control, so that the driving device can respond to sudden velocity variations or the presupposed velocity variations and without increasing the gear accuracy unnecessarily, the driving device can execute stable velocity control.

According to the image-forming apparatus described in anyone of items 10, 16 and 20, the same effects as those described in anyone of items 5, 11, 18 and 19 can be obtained undoubtedly and also in an image forming device for forming color images, the same effects can be obtained.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

As a preferred embodiment for execution of the present invention, a motor driving device for driving an intermediate transfer belt in an image forming device will be explained.

The preferred embodiment for execution of the present invention will be explained below with reference to the accompanying drawings.

Figure 1:
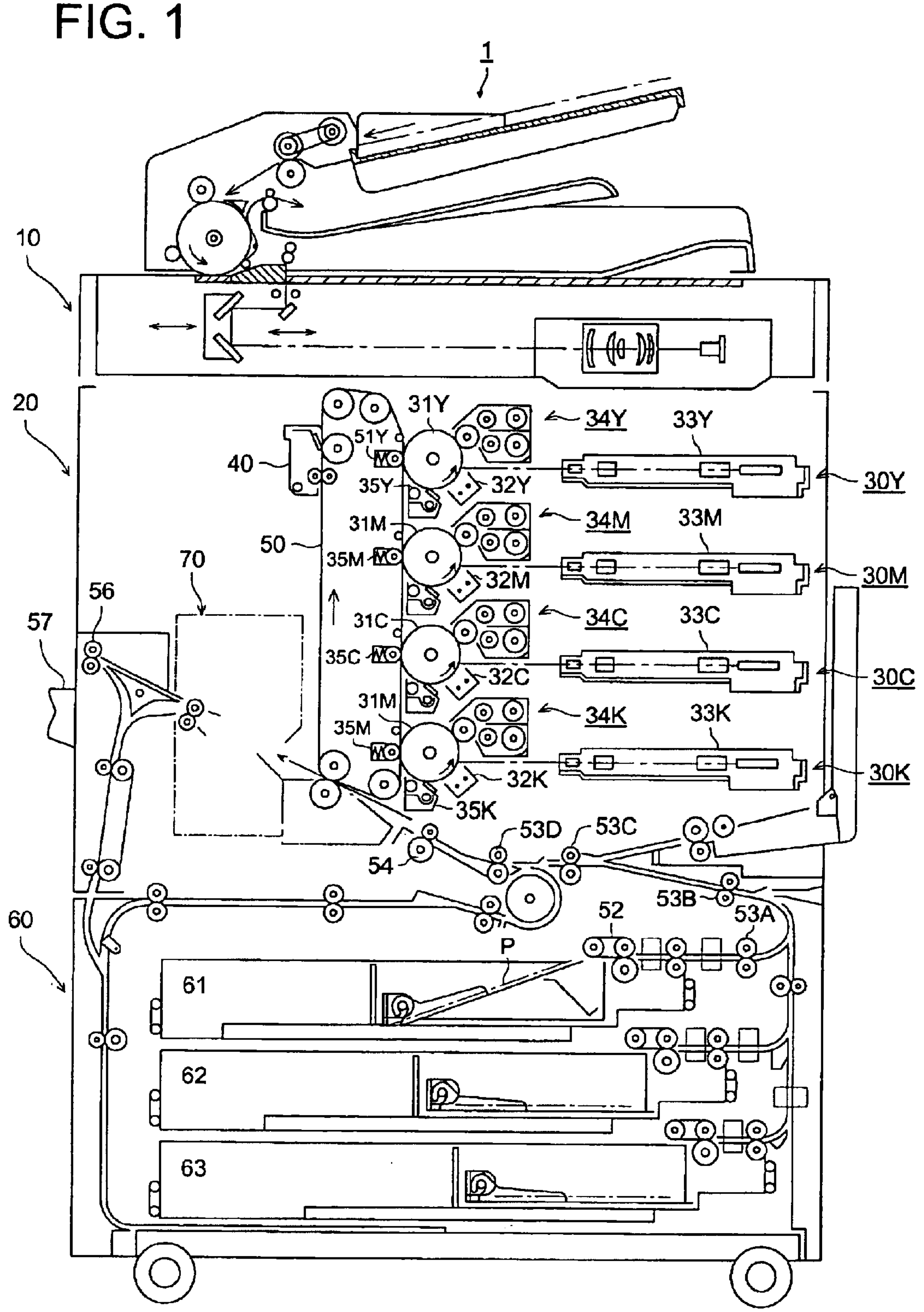
FIG. 1 is a cross sectional view of the internal configuration of an image forming apparatus 1 of the embodiment to which the present invention is applied.

FIG. 1 shows a cross sectional view of the internal constitution of the image forming apparatus 1 in this embodiment. As shown in FIG. 1, the image forming apparatus 1 is composed of an image reading section 10 and a printer section 20.

The image reading section 10 is composed of a scanner including a light source, a lens, and a charge coupled device (CCD), which focuses and photoelectrically converts reflected light of light irradiated to a document, thereby reads a document image, and outputs it to the printer section 20. In this case, the document image means to include not only image data such as figures and photographs but also text data such as characters and symbols.

The printer section 20 is composed of image forming sections 30Y, 30M, 30C, and 30K, a cleaning section 40, an intermediate transfer belt 50, a paper feed section 60, and a fixing section 70.

The image forming section 30Y includes a photosensitive drum 31Y, a charging unit 32Y, an exposure unit 33Y, a developing unit 34Y, and a cleaning unit 35Y and forms yellow (Y) images.

Concretely, light is irradiated to the photosensitive drum 31Y charged by the charging unit 32Y by the exposure unit 33Y, thus an electrostatic latent image is formed. And, the developing unit 34Y adheres charged toner to the surface of the photosensitive drum 31Y whereon the electrostatic latent image is formed and develops the electrostatic latent image. The photosensitive drum 31Y whereon the toner is adhered by the developing unit 34Y is rotated to the transfer position at a fixed velocity and is transferred to the intermediate transfer belt 50 which will be described later. After transfer to the intermediate transfer belt 50, the cleaning unit 35Y removes residual charges and residual toner on the surface of the photosensitive drum 31Y.

Similarly, the image forming section 30M includes a photosensitive drum 31M, a charging unit 32M, an exposure unit 33M, a developing unit 34M, and a cleaning unit 35M and forms magenta (M) images.

Further, the image forming section 30C includes a photosensitive drum 31C, a charging unit 32C, an exposure unit 33C, a developing unit 34C, and a cleaning unit 35C and forms cyan (C) images.

Furthermore, the image forming section 30K includes a photosensitive drum 31K, a charging unit 32K, an exposure unit 33K, a developing unit 34K, and a cleaning unit 35K and forms black (K) images.

The intermediate transfer belt 50 is suspended by a plurality of rollers, is rotatably supported, and is driven to rotate in correspondence with rotation of the rollers. Among the plurality of rollers, at least one is a driving roller coupled to the motor via a plurality of gears as a gear driving transmission mechanism. The rollers other than the driving roller are follower rollers rotating in correspondence with driven rotation of the intermediate transfer belt 50.

The intermediate transfer belt 50 is pressed respectively to the photosensitive drums 31Y, 31M, 31C, and 31K by primary transfer rollers 51Y, 51M, 51C, and 51K. By doing this, each toner developed on the surfaces of the photosensitive drums 31Y, 31M, 31C, and 31K is transferred to the intermediate transfer belt 50 at the transfer positions by the primary transfer rollers 51Y, 51M, 51C, and 51K and each toner of yellow, magenta, cyan, and black is sequentially superimposed and transferred.

When different velocities are generated between the photosensitive drums 31Y, 31M, 31C, and 31K and the intermediate transfer belt 50, toner images cannot be transferred from the photosensitive drums 31Y, 31M, 31C, and 31K at the fixed positions, and thereby, the color mismatching occurs.

In the paper feed section 60, a recording paper P stored in a paper tray 61, 62, or 63 is fed by a paper feed section 52 and is conveyed to a secondary transfer roller 55 via a plurality of intermediate rollers 53A, 53B, 53C, and 53D and a register roller 54. The toner images transferred to the intermediate transfer belt 50 by the secondary transfer roller 55 are transferred to the surface of the recording paper P.

And, with respect to the recording paper P whereon the toner images of yellow, magenta, cyan, and black are superimposed, the toner images transferred on the recording paper P are fixed by heat at the fixing section 70. The fixed recording paper P is clamped by paper ejection rollers 56 and is loaded on a paper ejection tray 57.

On the other hand, after the toner images are transferred to the recording paper P by the secondary transfer roller 55, from the intermediate transfer belt 50 wherefrom the recording paper P is separated electrostatically due to the curvature, the residual toner is removed by the cleaning section 40.

Figure 2:
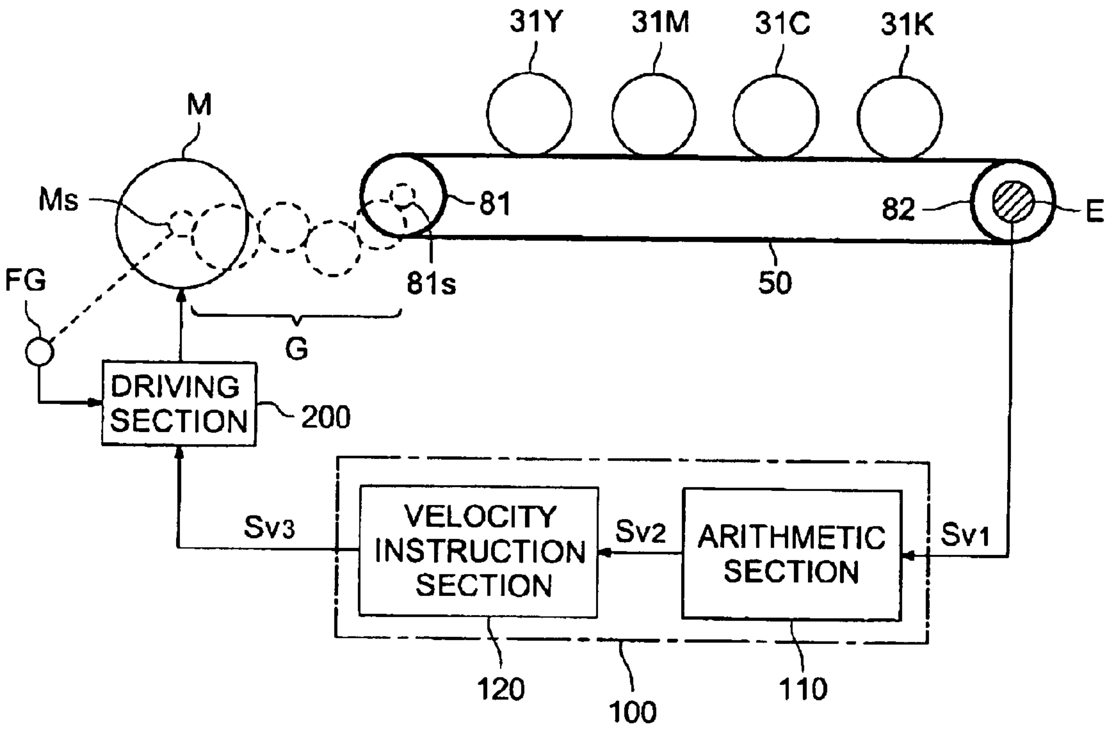
FIG. 2 is a schematic block diagram relating to driving of an intermediate transfer belt 50.

FIG. 2 shows a schematic block diagram relating to driving of the intermediate transfer belt 50.

As shown in FIG. 2, the driving device includes the intermediate transfer belt 50 whereto electrostatic images are transferred from the photosensitive drums 31Y, 31M, 31C, and 31K, a driving roller 81 and a follower roller 82 for rotating the intermediate transfer belt 50, a motor M coupled via a plurality of gears G for driving to rotate the intermediate transfer belt 50, an encoder E as a velocity detecting means to realize the present invention, an arithmetic section 110 and a velocity instruction section 120 in a controlling section 100 as a second rotational velocity controlling means, and a driving section 200 as a first rotation controlling means for driving to rotate the motor M.

The encoder E detects the rotational velocity of the follower roller 82 (that is, the rotational velocity of the intermediate transfer belt 50). The detected velocity signal Sv1 is input to the arithmetic section 110.

The arithmetic section 110 performs arithmetic, which will be described later, on the basis of the detected velocity signal Sv1 and outputs an arithmetic signal Sv2 to the velocity instruction section 120.

Upon receipt of the arithmetic signal Sv2, the velocity instruction section 120 outputs a concrete velocity instruction signal Sv3 according to the driving method of the motor M to the driving section 200.

The driving section 200 detects the rotational velocity of the motor M, compares the detected rotational velocity of the motor M with the velocity instruction signal Sv3 from the velocity instruction section 120, and executes the feedback control for correcting the rotational speed of the motor M.

The driving section 200 is composed of a power transistor, a FET (field effect transistor), a MOSFET (metal oxide semiconductor FET), and an IGBT (insulated gate bipolar transistor).

The motor M used to drive to rotate the intermediate transfer belt 50 is frequently operated, so that a DC brushless motor having a long life span and high fixed velocity stability is preferably used. However, an AC motor, an induction motor, or a stepping motor may be used.

The motor M, by a drive signal from the driving section 200, executes start or stop control and velocity control such as acceleration of deceleration. Further, the motor revolving shaft Ms of the motor M is coupled to a plurality of gears G, transmits the driving power to the driving roller 81 via the plurality of gears G, and drives to rotate the intermediate transfer belt 50.

The plurality of gears G are composed of a plurality of gears and couplings and efficiently transmit the power from the motor M to the driving roller 81.

A driving roller revolving shaft 81*s* of the driving roller 81 is coupled to the motor M via the plurality of gears G and is driven to rotate.

The intermediate transfer belt 50, since the belt-shaped member formed by an elastic body such as rubber is suspended by the driving roller 81 and the follower roller 82, is driven to rotate according to rotation driving of the driving roller 81.

The follower roller 82 is rotated according to rotation driving of the intermediate transfer belt 50, so that the rotational velocity thereof is varied with velocity changes of the intermediate transfer belt 50. Therefore, the follower roller 82 is equipped with the encoder E as a velocity detecting means to detect the velocity of the intermediate transfer belt 50.

Figure 3:
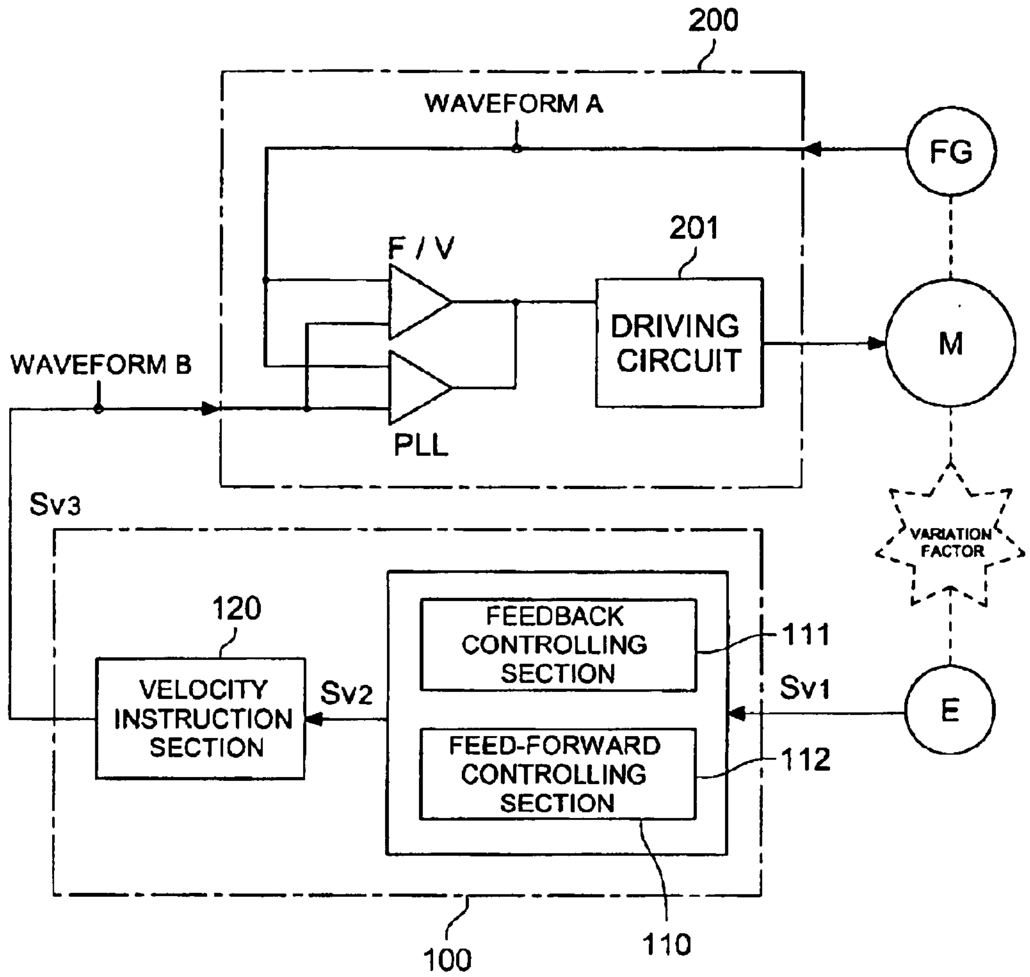
FIG. 3 is a block diagram of motor control.

FIG. 3 shows a block diagram of motor control.

As shown in FIG. 3, the encoder E outputs the detected velocity signal Sv1 to the arithmetic section 110, and the arithmetic section 110 outputs the arithmetic signal Sv2 to the velocity instruction section 120 on the basis of the detected velocity signal Sv1, and the velocity instruction section 120, upon receipt of the arithmetic signal Sv2, outputs the concrete velocity instruction signal Sv3 to the driving section 200, and the driving section 200 drives to rotate the motor M on the basis of the velocity instruction signal Sv3, rotates the driving roller 81 via the plurality of gears G coupled to the motor revolving shaft Ms of the motor M, thereby drives to rotate the intermediate transfer belt 50.

In the intermediate transfer belt 50 driven to rotate by the motor M, velocity variations are caused due to various variation factors and velocity variations of the intermediate transfer belt 50 are detected by the encoder E.

For example, as variation factors, variations due to the backlash and eccentricity of the plurality of gears G, effects of the electrical coupling when the photosensitive drums 31Y, 31M, 31C, and 31K and the intermediate transfer belt 50 are charged, the contact resistance when the photosensitive drums 31Y, 31M, 31C, and 31K make contact with the intermediate transfer belt 50, expansion and contraction variations of an elastic body such as a belt used as a member for forming the intermediate transfer belt 50, and the mechanical resistance by the recording paper P at the time of rushing when it is conveyed to the intermediate transfer belt 50 may be cited.

The arithmetic section 110 has a feedback controlling section 111 and a feed-forward controlling section and performs arithmetic on the basis of the detected velocity signal Sv1.

The feedback controlling section 111 compares the input detected velocity signal Sv1 with a predetermined target value, performs arithmetic on the operation amount so as to coincide the detected velocity signal Sv1 with the target value, and controls so as to respond to sudden variations due to the rushing resistance of a paper when it is conveyed to the intermediate transfer belt 50 as a recording paper P. The feedback controlling section 111 controls using PI control (proportional and integral control) and PID control (proportional, integral, and derivative control).

The feed-forward controlling section 112 predicts a presupposed variation on the basis of the input detected velocity signal Sv1 and decides the arithmetic signal Sv2. Therefore, the feed-forward controlling section 112 measures variation factors beforehand and controls in correspondence with periodic variations such as variations due to the backlash and eccentricity of the plurality of gears G which can be confirmed, effects of the electrical coupling of the photosensitive drums 31Y, 31M, 31C, and 31K and the intermediate transfer belt 50, the contact resistance between the photosensitive drums 31Y, 31M, 31C, and 31K and the intermediate transfer belt 50, and intrinsic variations of the constituent member forming the intermediate transfer belt 50.

Further, the arithmetic section 110 in this embodiment has a constitution composed of the feedback controlling section 111 and the feed-forward controlling section 112. However, the constitution may be a one having either of the feedback controlling section 111 and the feed-forward controlling section 112.

The velocity instruction section 120, upon receipt of the arithmetic signal Sv2, performs frequency modulation, generates the concrete velocity instruction signal Sv3, and outputs it to the driving section 200. As frequency modulation, the velocity instruction section 120, by the input arithmetic signal Sv2, executes pulse control, switching control, chopper control, and PWM (pulse width modulation) control according to the driving method of the motor M and outputs a clock signal or a PWM signal as a velocity instruction signal Sv3.

The driving section 200 has a constitution composed of an FG (frequency generator) for detecting the rotational velocity of the motor M itself, an F/V for comparing a velocity signal from the FG with the velocity instruction signal Sv3 and controlling the velocity, a PLL (phase locked loop, phase synchronous circuit) for comparing a velocity signal from the FG with the velocity instruction signal Sv and controlling the phase, and a driving circuit 301 for driving the motor M on the basis of signals from the F/V and PLL.

The driving section 200 executes the feedback control by the rotational velocity of the motor M itself which is detected from the FG and double control of the feedback control and feed-forward control by the velocity of the intermediate transfer belt 50 which is detected from the encoder E, thus different velocities of the intermediate transfer belt 50 can be reduced by a simple constitution.

FIGS. 4 to 7 show graphs of modulation frequency characteristics of the motor control unit of the present invention.

The waveform A is a waveform that the output signal from the FG shown in FIG. 3 is converted to an angular velocity and the waveform B is a waveform that the velocity instruction signal Sv3 shown in FIG. 3 is converted to an angular velocity.

Figure 4:
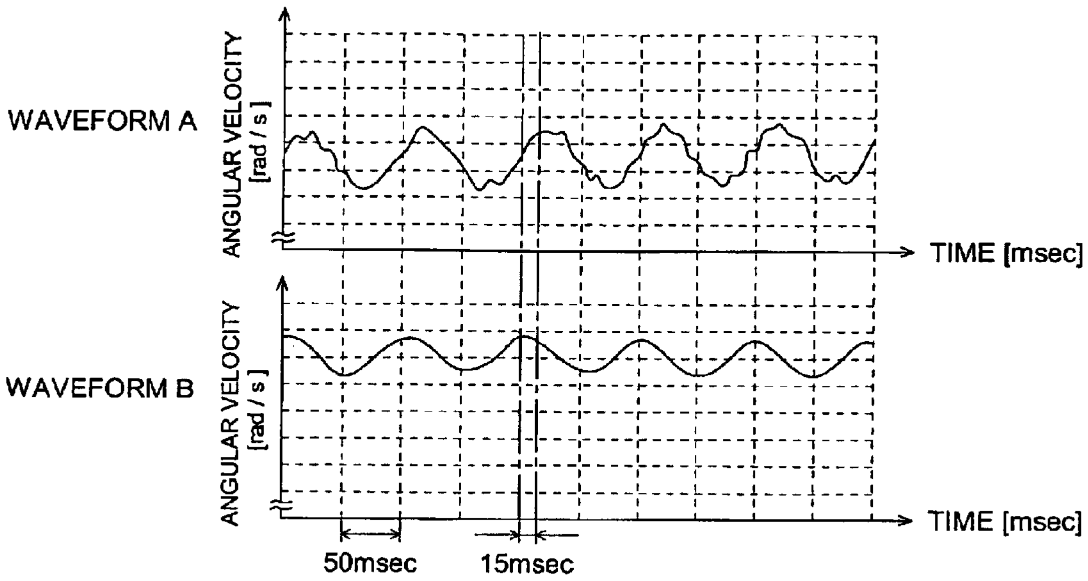
FIG. 4 is a graph of modulation frequency characteristics when a clock signal which is a 0.2% velocity instruction signal Sv3 to a modulation frequency of 10 Hz in the motor control unit of the present invention.

FIG. 4 shows a case when a clock signal, which is the 0.2% velocity instruction signal Sv3, is given to a modulation frequency of 10 Hz and the time is indicated by a dashed line every 50 ms.

The periods of the waveforms A and B are about 100 ms and the time indicated by two alternate long and short dashed lines indicates a phase difference of 15 ms between the waveforms A and B.

Figure 5:
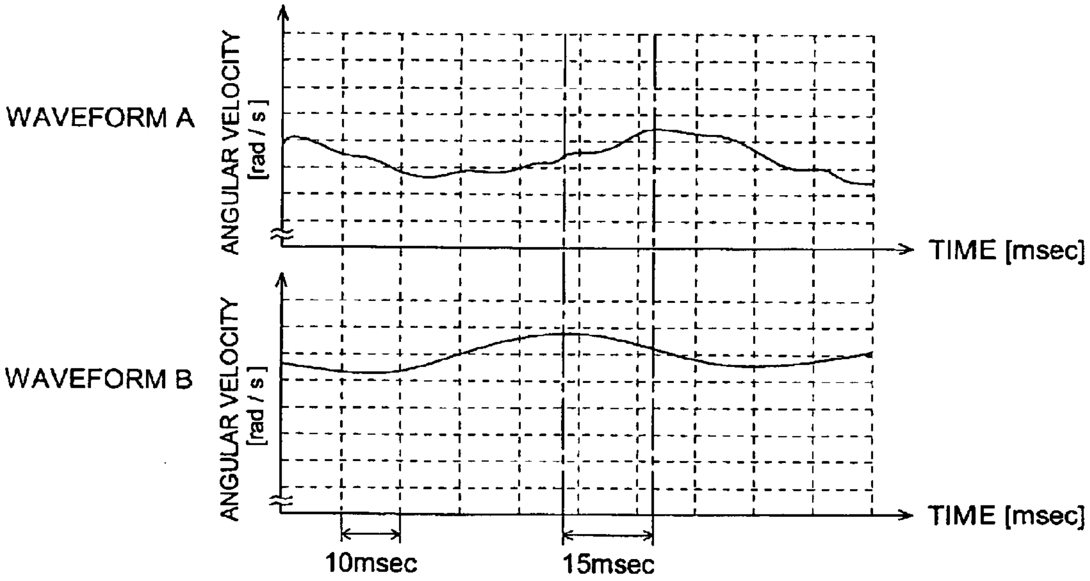
FIG. 5 is a graph of modulation frequency characteristics when a clock signal which is a 0.2% velocity instruction signal Sv3 to a modulation frequency of 15 Hz in the motor control unit of the present invention.

FIG. 5 shows a case when a clock signal, which is the 0.2% velocity instruction signal Sv3, is given to a modulation frequency of 15 Hz and the time is indicated by a dashed line every 10 ms.

The periods of the waveforms A and B are about 67 ms and the time indicated by two alternate long and short dashed lines indicates a phase difference of 15 ms between the waveforms A and B.

Figure 6:
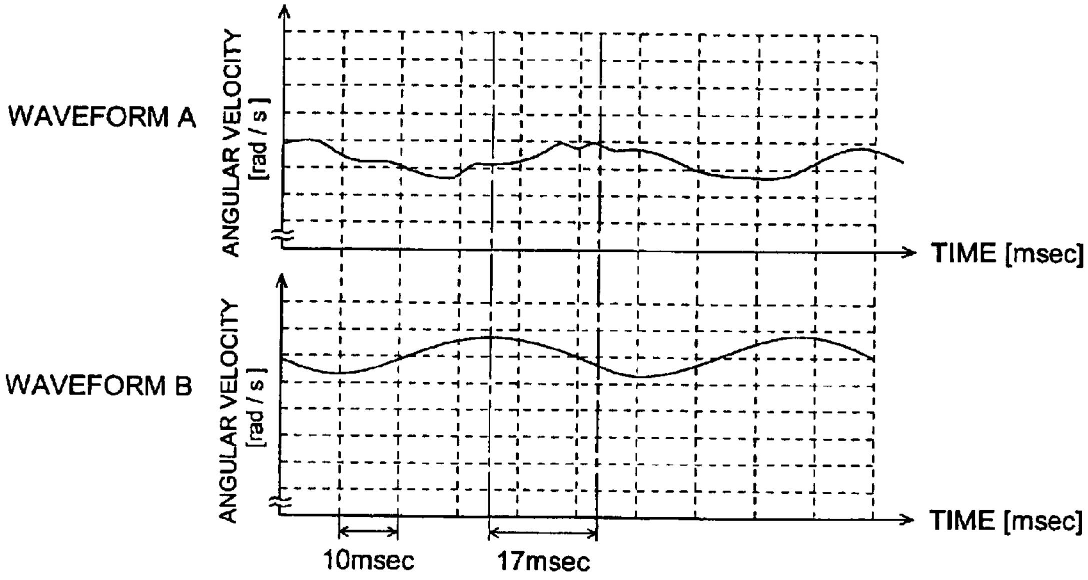
FIG. 6 is a graph of modulation frequency characteristics when a clock signal which is a 0.2% velocity instruction signal Sv3 to a modulation frequency of 20 Hz in the motor control unit of the present invention.

FIG. 6 shows a case when a clock signal which is the 0.2% velocity instruction signal Sv3 is given to a modulation frequency of 20 Hz and the time is indicated by a dashed line every 10 ms.

The periods of the waveforms A and B are about 50 ms and the time indicated by two alternate long and short dashed lines indicates a phase difference of 17 ms between the waveforms A and B.

Figure 7:
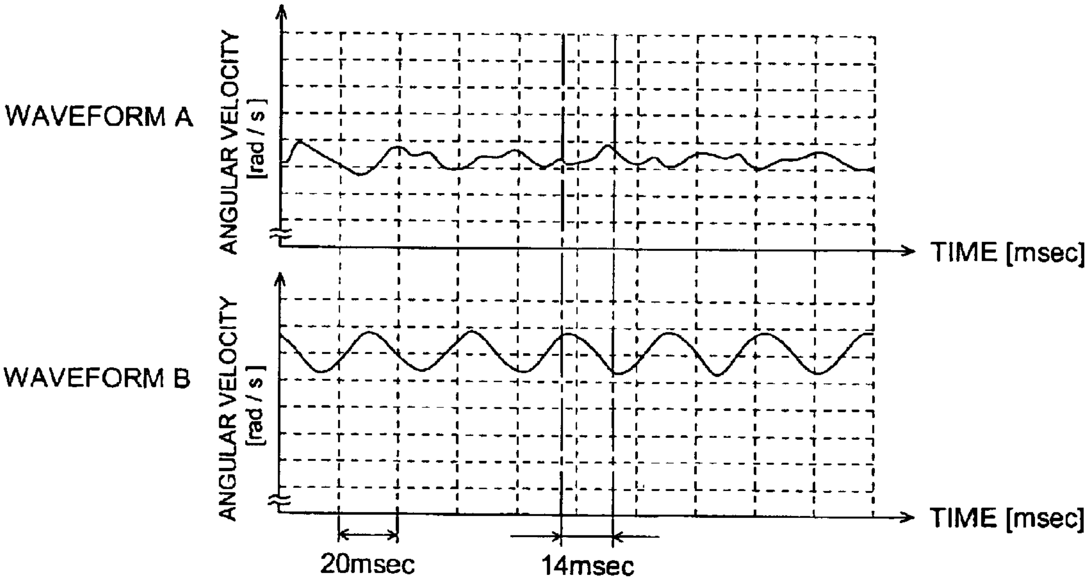
FIG. 7 is a graph of modulation frequency characteristics when a clock signal which is a 0.2% velocity instruction signal Sv3 to a modulation frequency of 30 Hz in the motor control unit of the present invention.

FIG. 7 shows a case when a clock signal which is the 0.2% velocity instruction signal Sv3 is given to a modulation frequency of 30 Hz and the time is indicated by a dashed line every 20 ms.

The periods of the waveforms A and B are about 34 ms and the time indicated by two alternate long and short dashed lines indicates a phase difference of 14 ms between the waveforms A and B.

As shown in FIGS. 4 to 7, the phase of the waveform A is delayed than the phase of the waveform B, and the phase difference between the waveforms A and B is about 54° in a case of 10 Hz shown in FIG. 4, about 80° in a case of 15 Hz shown in FIG. 5, about 122° in a case of 20 Hz shown in FIG. 6, and about 152° in a case of 30 Hz shown in FIG. 7, and when the phase difference is smaller than 90° which is a controllable range, the modulation frequency is 15 Hz or smaller.

Further, when the modulation frequency shown in FIG. 7 is 30 Hz, the amplitude of the waveform A is attenuated and the response characteristic cannot be seen much.

Therefore, it is preferable to set the upper limit of the modulation frequency according to the transmission characteristics of the motor M and the driving section 200 to be used.

It is known that velocity variations generated in the intermediate transfer belt 50 used in this embodiment are remarkably seen in the low frequency zone and when the frequency in the low frequency zone is set to a reducible modulation frequency, velocity variations can be reduced.

Figure 8:
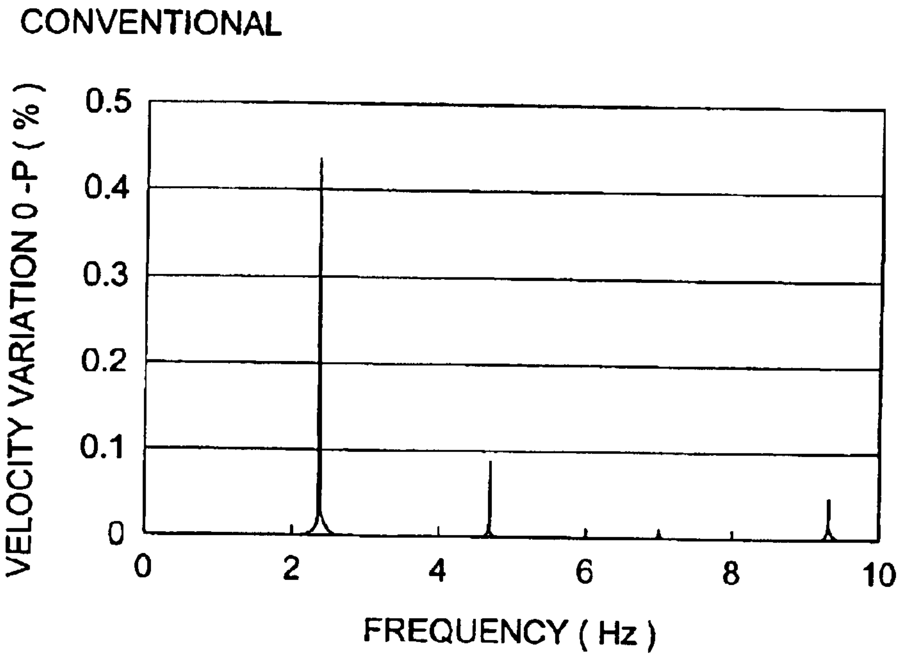
FIG. 8(*a*) and FIG. 8(*b*) are graphs of velocity variation characteristics of the intermediate transfer belt 50.
Figure 8:
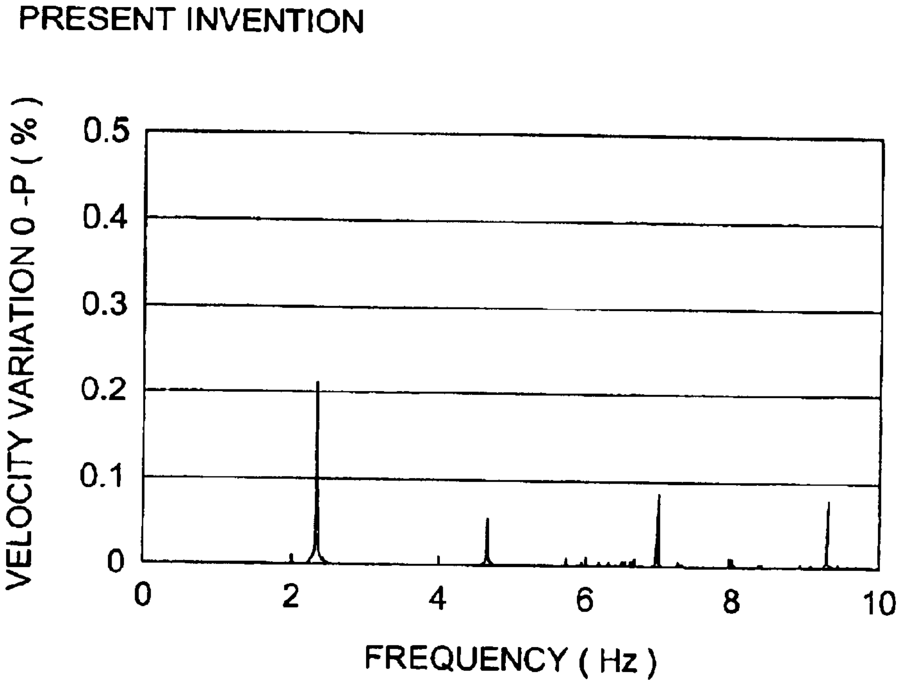

FIG. 8(*a*) and FIG. 8(*b*) shows graphs of velocity variation characteristics of the intermediate transfer belt 50.

FIG. 8(*a*) shows a conventional graph, while FIG. 8(*b*) shows a graph that the detected velocity signal Sv1 from the encoder E installed in the follower roller 82 of the present invention is analyzed by frequency.

As shown in FIG. 8(*a*), in a frequency of about 2.3 Hz, a remarkable velocity variation of about 0.44% as a velocity variation rate is generated.

On the other hand, as shown in FIG. 8(*b*), in the present invention, the velocity variation remarkably appearing at a frequency of about 2.3 Hz is reduced to about 0.22% and can be reduced to about ½ of the conventional one. Further, in other frequencies, the velocity variation is 0.1% or less, so that the color mismatching due to the velocity difference of the intermediate transfer belt 50 can be reduced.

As mentioned above, the driving unit of the motor M equipped with the driving section 200 for driving to rotate the intermediate transfer belt 50 in the image forming device for forming color images of yellow, magenta, cyan, and black has the controlling section 100 for detecting the rotational velocity of the follower roller 82 and controlling the rotational velocity of the motor M on the basis of the detected velocity, so that double control of the driving section 200 and the controlling section 100 can be constituted simply at a low price, and different velocities due to improvement of the velocity controllability for the intermediate transfer belt 50 can be reduced, and the color mismatching can be reduced. Further, the arithmetic section 100 in the controlling section 100 includes the feedback controlling section 111 and the feed-forward controlling section 112, so that the driving unit can respond to sudden velocity variations and presupposed velocity variations and can execute stable velocity control without increasing the gear accuracy unnecessarily.

Figure 9:
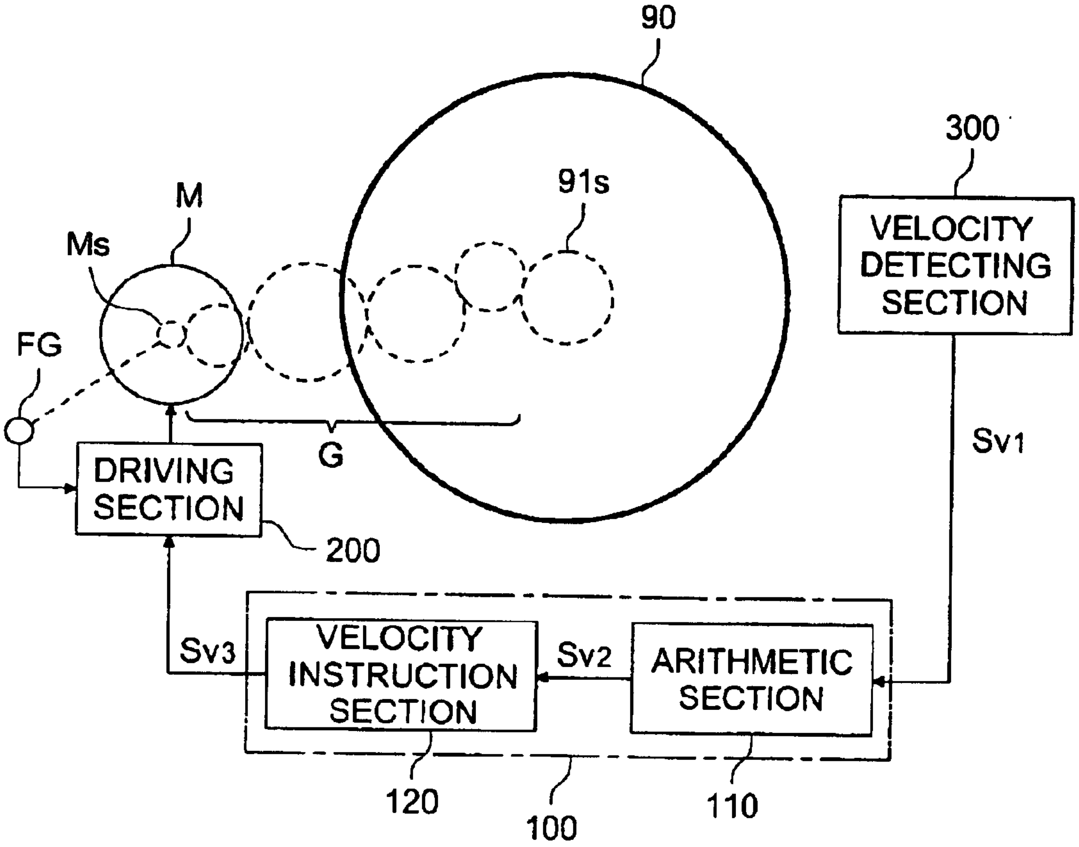
FIG. 9 is a schematic block diagram relating to driving of a transfer drum 90.

As another embodiment of the present invention, FIG. 9 shows a schematic block diagram relating to driving of the intermediate transfer drum 90. The rough constitution relating to driving of the intermediate transfer drum 90 shown in FIG. 9 is different from the rough constitution relating to driving of the intermediate transfer belt 50 shown in FIG. 2 in that the intermediate transfer belt 50 is switched to the intermediate transfer drum 90, and the driving roller revolving shaft 81*s* is switched to the intermediate transfer drum revolving shaft 91*s*, and the encoder E installed in the follower roller 82 is switched to a velocity detecting section 300 for detecting the circumferential-surface velocity of the intermediate transfer drum 90.

The other rough constitution and motor control relating to driving of the intermediate transfer drum 90 are the same as those shown in FIGS. 2 and 3, so that the same numerals are assigned to the components and the explanation of the constitution will be omitted.

The intermediate transfer drum 90 is formed by mechanically processing a metallic member and due to surface finishing characteristics and eccentricity and distortion of a drum during processing, different velocities are caused in the same way as with the intermediate transfer belt 50.

Further, the intermediate transfer drum shaft 91*s* of the intermediate transfer drum 90 is driven to rotate by the motor M via the plurality of gears G, so that in the same way as with the intermediate transfer belt 50, the intermediate transfer drum 90 is affected by variations due to the backlash and eccentricity of the plurality of gears G, electrical coupling when the photosensitive drum not shown in the drawing and the intermediate transfer drum 90 are charged, the contact resistance when the photosensitive drum makes contact with the intermediate transfer drum 90, and the rushing resistance of a paper when it is conveyed to the intermediate transfer drum 90 as a recording paper P, thus different velocities are caused.

Therefore, the velocity detecting section 300 for detecting the circumferential-surface velocity of the intermediate transfer drum 90 is installed and the motor control in the present invention is executed on the basis of a detected velocity signal from the velocity detecting section 300, thus different velocities can be reduced and the color mismatching can be prevented.

In the same way as with the aforementioned intermediate transfer belt, the driving unit of the motor equipped with the driving section 200 for driving to rotate the intermediate transfer belt 50 in the image forming device for forming color images of yellow, magenta, cyan, and black has the controlling section 100 for detecting the circumferential-surface velocity of the intermediate transfer drum 90 and controlling the rotational velocity of the motor on the basis of the detected velocity, so that double control of the driving section 200 and the controlling section 100 can be constituted simply at a low price, and different velocities due to improvement of the rotational velocity controllability for the intermediate transfer drum 90 can be reduced. Further, the arithmetic section 100 in the controlling section 100 includes the feedback controlling section 111 and the feed-forward controlling section 112, so that the driving unit can respond to sudden velocity variations and presupposed velocity variations and can execute stable velocity control without increasing the gear accuracy unnecessarily.

Further, the transfer body as an image carrying member is explained above. However, as another example, when the present invention is applied to the photosensitive drum and photosensitive belt, the same effects can be obtained.

Disclosed embodiment can be varied by a skilled person without departing from the spirit and scope of the invention.

What is claimed is:

1. A device for driving a rotation system, comprising:

a first rotational-velocity controlling section to control a first rotational velocity of a motor, which is coupled to a driven axis of said rotation system through a power transmission element;

a velocity detecting section to detect a second rotational velocity at said power transmission element; and a second rotational-velocity controlling section to also control said first rotational velocity of said motor, based on a detected signal detected by said velocity detecting section.

2. The device of claim 1, wherein one of said first rotational-velocity controlling section and said second rotational-velocity controlling section coarsely controls said first rotational velocity, while another one of them finely controls said first rotational velocity.

3. The device of claim 1, wherein said second rotational-velocity controlling section employs either a feedback controlling method or a feed-forward controlling method to control said first rotational velocity.

4. The device of claim 1, wherein said power transmission element is a gear or a gears train including a plurality of gears.

5. An apparatus for forming an image, comprising:

a rotation system that is constituted by at least a transfer belt, a driving roller and a driven roller, wherein said transfer belt is threaded on both said driving roller and said driven roller;

a motor that serves as a driving device to drive said rotation system, a rotational axis of said motor being coupled to said driving roller directly or through a power transmission element disposed between them;

a first rotational-velocity controlling section to control a first rotational velocity of said motor;

a velocity detecting section to detect a second rotational velocity of said driving roller or said driven roller; and a second rotational-velocity controlling section to also control said first rotational velocity of said motor, based on a detected signal detected by said velocity detecting section.

6. The apparatus of claim 5, wherein one of said first rotational-velocity controlling section and said second rotational-velocity controlling section coarsely controls said first rotational velocity, while another one of them finely controls said first rotational velocity.

7. The apparatus of claim 5, wherein said second rotational-velocity controlling section employs either a feedback controlling method or a feed-forward controlling method to control said first rotational velocity.

8. The apparatus of claim 5, wherein said power transmission element is a gear or a gears train including a plurality of gears.

9. The apparatus of claim 5, wherein said transfer belt includes a photosensitive material or is a photoreceptor belt.

10. The apparatus of claim 5, wherein said image is a color image.

11. An apparatus for forming an image, comprising:

a transfer drum;

a motor that serves as a driving device to drive said transfer drum, a rotational axis of said motor being coupled to said transfer drum through a power transmission element disposed between them;

a first rotational-velocity controlling section to control a rotational velocity of said motor;

a velocity detecting section to detect a circumferential-surface velocity of said transfer drum; and a second rotational-velocity controlling section to also control said rotational velocity of said motor, based on a detected signal detected by said velocity detecting section.

12. The apparatus of claim 11, wherein one of said first rotational-velocity controlling section and said second rotational-velocity controlling section coarsely controls said rotational velocity of said motor, while another one of them finely controls said rotational velocity of said motor.

13. The apparatus of claim 11, wherein said second rotational-velocity controlling section employs either a feedback controlling method or a feed-forward controlling method to control said rotational velocity of said motor.

14. The apparatus of claim 11, wherein said power transmission element is a gear or a gears train including a plurality of gears.

15. The apparatus of claim 11, wherein said transfer drum includes a photosensitive material or is a photoreceptor drum.

16. The apparatus of claim 11, wherein said image is a color image.

* * * * *